United States Patent

Jones

[15] 3,687,910
[45] Aug. 29, 1972

[54] TRANSITION METAL OXIDE CATALYSTS

[72] Inventor: Richard Hamilton Jones, Newark, Del.

[73] Assignee: E. I. du Pont de Nemours and Company, Wilmington, Del.

[22] Filed: March 20, 1970

[21] Appl. No.: 21,484

[52] U.S. Cl............260/80.78, 252/430, 252/431 R, 260/88.2, 260/93.7, 260/94.9 B, 260/94.9 C, 260/94.9 E
[51] Int. Cl..............................C08f 1/56, C08f 3/06
[58] Field of Search........23/202; 252/461, 430, 463; 260/80.78, 88.2, 94.9 B, 94.9 D, 93.7, 429.5, 94.9 E

[56] References Cited

UNITED STATES PATENTS

| | | | |
|---|---|---|---|
| 3,326,871 | 6/1967 | Shepard et al. | 260/94.9 |
| 2,912,421 | 11/1959 | Juneland et al. | 260/93.7 |
| 3,008,948 | 11/1961 | Stampa et al. | 260/94.9 |
| 3,297,414 | 1/1967 | Magdiyasni et al. | 23/202 |
| 3,300,463 | 1/1967 | Mare | 260/93.7 |
| 3,493,554 | 2/1970 | Rekers | 260/94.9 |
| 3,177,194 | 4/1965 | Stampa | 260/94.9 |

FOREIGN PATENTS OR APPLICATIONS

| | | |
|---|---|---|
| 853,229 | 11/1960 | Great Britain |
| 1,800,742 | 8/1969 | Germany |

OTHER PUBLICATIONS

Cullinane et al., J. Appl. Chem., I, Sept. 1951, pages 400–406

Field et al., The Organic Chemistry of Titanium, Butterworth, Inc., Wash., D.C., 1965, pages 25–34.

Primary Examiner—Joseph L. Schofer
Assistant Examiner—Edward J. Smith
Attorney—Earl L. Handley

[57] ABSTRACT

A catalyst component comprising the product formed by heating at from 150°C. to 400°C., the secondary and/or tertiary alkoxide of the metals of Groups IVB, VB, and VIB, and, optionally, aluminum trialkyl, secondary aluminum alkoxide or tertiary aluminum alkoxide, the heating being done optionally in the presence of hydrocarbon solvent and/or tertiary alcohol and/or water; polymerization catalysts comprising (a) the catalyst component and (b) at least one alkyl or aryl of the metals of Groups IA, IIA, IIB, and IIIA; and a process for polymerization of ethylenically unsaturated olefins which utilizes the above polymerization catalyst.

21 Claims, No Drawings

3,687,910

TRANSITION METAL OXIDE CATALYSTS

This invention relates to a catalyst component; particularly this invention relates to a catalyst component which is made by heating secondary and/or tertiary alkoxides of the metals of Groups IVB, VB, and VIB and, optionally, aluminum trialkyl and/or secondary and/or tertiary aluminum alkoxides optionally in the presence of tertiary alcohol and/or water and/or hydrocarbon solvent. More particularly, this invention relates to a polymerization catalyst comprising (a) the catalyst component and (b) at least one alkyl or aryl of the metals of Groups IA, IIA, IIB, and IIIA. Even more particularly, this invention relates to a process for polymerizing ethylenically unsaturated olefins which utilizes the metal oxide catalyst.

Catalysts formed by mixing either the salts, freshly precipitated oxides or hydroxides of the metals of Groups IVB, VB and VIB with aluminum trialkyl are known (U.S. Pat. No. 3,257,332). The hydrolysis of Group IVB metal alkoxide (U.S. Pat. No. 2,943,066) and aluminum alkoxide to form their oxides which are used in catalysts for olefin polymerization is also known. However, more active noncorrosive catalysts which do not have to be removed after polymerization have been sought for the polymerization of olefins.

A catalyst component which is a precipitate comprising metal oxide and which is formed by the thermal decomposition of the alkoxides of the metals of Groups IVB, VB, and VIB, and optionally aluminum trialkyl or secondary or tertiary aluminum alkoxide when used with an alkyl or aryl of the metals of Groups IA, IIA, IIB, and IIIA fills the above requirement. The catalyst component comprises the product formed by heating at from 150°C. to 400°C. a substance comprising (a) 100–5 mol percent (expressed as the mols of the metals of Groups IVB, VB, and VIB relative to the mols of aluminum, plus the mols of the metals of Groups IVB, VB, and VIB present in the substance) of at least one member selected from the class consisting of secondary alkoxides of the metals of Groups IVB, VB, and VIB and tertiary-alkoxides of the metals of the Groups IVB, VB, and VIB, and (b) 0–95 mol percent (expressed as the mols of aluminum relative to the mols of the metals of Groups IVB, VB, and VIB plus the mols of aluminum present in the substance) of a member selected from the class consisting of aluminum trialkyl, secondary aluminum alkoxide, tertiary aluminum alkoxide and mixtures thereof. Throughout the specification and claims, Groups IA, IIA, IIB, IIIA, IVB, VB, and VIB refer to those groups in the Periodic Table of The Elements, depicted on pages 60–61 of the "Handbook of Chemistry" by N. A. Lange, Revised 10th Edition, 1967 and "substance" is as is defined in sentence two of this paragraph.

The heating of the substance normally is from 1 second to one hour with 30 seconds to 15 minutes usually being sufficient for the metal oxide precipitate to form. The preferred temperature range for the heating is from 200° to 300°C. Heating of the alkoxides of the metals of Groups IVB, VB, and VIB and the aluminum trialkyl or aluminum alkoxide is usually done in a hydrocarbon solvent, but can be done in the absence of one. Also, the heating can be done in the presence of water wherein the mol ratio of water to aluminum present is from 0.1:1 to 2:1 with the preferred amount of water present expressed as the mol ratio of water to aluminum being about 1:1.

If the secondary alkoxide of the Group IVB, VB, and VIB metals or the secondary aluminum alkoxide or aluminum trialkyl are utilized, it is beneficial to heat the substance in the presence of tertiary alcohol such that the tertiary alkoxides form before the substance is thermally decomposed into the oxides. The secondary or tertiary alkoxides of the aluminum of Group IVB, VB, and VIB metals for use in the process for preparing the catalyst component as depicted above, can be formed by heating the primary alkoxide with either secondary or tertiary alcohol. Other well known methods for production of the secondary or tertiary alkoxides can also be utilized. Particular tertiary alcohols that are useful for the above purpose are t-butyl alcohol, t-amyl alcohol, 2-methyl-2-pentanol, 2-methyl-2-hexanol, 2-methyl-2-heptanol, and 4-methyl-4-heptanol. The amount of alcohol usually utilized is the amount necessary to convert the secondary alkoxide of the Group IVB, VB, or VIB metals to tertiary alkoxides or to convert the aluminum trialkyl or secondary aluminum alkoxides to tertiary alkoxides, although an excess can be employed.

The preferred composition of the substance which is to be heated to form the catalyst component comprises 85–50 percent (expressed as the mols of the metals of Groups IVB, VB, and VIB relative to the mols of the metals of Groups IVB, VB, and VIB plus the mols of aluminum present in the substance) of at least one member selected from the class consisting of secondary alkoxides of the metals of Groups IVB, VB, and VIB and tertiary alkoxides of the metals of Groups IVB, VB and VIB and 15–50 percent (expressed as the mols of aluminum relative to the mols of the metal of Groups IVB, VB, and VIB plus the mols of aluminum present in the substance) of a member selected from the class consisting of aluminum trialkyl, secondary aluminum alkoxide, tertiary aluminum alkoxide and mixtures thereof. The normally employed secondary alkoxides of the metals of Groups IVB, VB, and VIB are tetraisopropyl titanate and tetraisopropyl zirconate, while the generally utilized tertiary alkoxides of the metals of Groups IVB, VB, and VIB are tetra-t-butyl titanate, tetra-t-butyl zirconate, tri-t-butyl vanadate, tetra-t-amyl titanate, tetra-t-amyl zirconate and tri-t-amyl vanadate. The normally utilized aluminum trialkyls are triisobutyl aluminum and triethyl aluminum while the generally used secondary aluminum alkoxide is aluminum isopropoxide and the usually employed tertiary aluminum alkoxides are aluminum-t-butoxide and aluminum-t-pentoxide.

Hydrocarbon solvents which are generally utilized are hexane, cyclohexane, n-hexadecane, benzene, toluene, xylene and chlorinated aromatic hydrocarbon solvents.

The catalyst component is useful as a part of a polymerization catalyst utilized in polymerizing olefins. Such a polymerization catalyst comprises (a) catalyst component as described above and (b) at least one member selected from the class consisting of alkyls of the metals of Groups IA, IIA, IIB, and IIIA and aryls of the metals of Groups IA, IIA, IIB, and IIIA. The amount of the alkyls and/or aryls of the metals of Groups IA, IIA, IIB, and IIIA is normally 0.1:1 to 10:1, expressed as the mol ratio of the metals of Groups IA, IIA, IIB, and IIIA to the Group IVB, VB and VIB metals, the preferred range is 0.1:1 to 1:1. The alkyls will normally contain one to 12 carbon atoms while the aryls will normally contain six to 12 carbon atoms in each substituent alkyl or aryl. The preferred alkyls and aryls of the metals of Groups IA, IIA, IIB, and IIIA are aluminum trialkyl, i.e., triisobutyl aluminum and triethyl aluminum, magnesium dialkyl, i.e., diethyl magnesium, lithium alkyl, i.e., n-butyl lithium, diphenyl magnesium and diethyl zinc with the most preferred being triisobutyl aluminum and triethyl aluminum.

The polymerization catalyst is useful in the polymerization of olefins since it is active, noncorrosive and generally does not have to be removed after polymerization from the polymer, because it is normally white. A process for such is a process for the polymerization of ethylenically unsaturated olefins which comprises contacting said olefin at 0° to 300°C. with a catalytic amount of the polymerization catalyst set forth above. The process is usually run at from 0 to 30,000 psig. for 0.1 to 1000 minutes, with the preferred pressures and times being 15 to 2000 psig and 1 to 60 minutes, respectively. The preferred reaction temperature is 25° to 250°C. The amount of polymerization catalyst recited above in the reactor, is normally 0.001 to 2 percent by weight of the total weight of the contents of the reactor with 0.01 to 0.2 percent usually being sufficient. The olefin can be contacted with the polymerization catalyst as a combination of the catalyst component and the alkyls and/or aryls of the metals of Groups IA, IIA, IIB, and IIIA or the olefin can be contacted with the catalyst component first and then the alkyls and/or aryls of the metals of Groups IA, IIA, IIB, and IIIA added or the olefin can be contacted with the catalyst component at the same time as the alkyls and/or aryls of the metals of Groups IA, IIA, IIB, and IIIA.

The ethylenically unsaturated olefins which can be polymerized by the above process include ethylene, propylene, mixtures of ethylene and 1-olefins of more than two carbon atoms, mixtures of propylene and 1-olefins of more than three carbon atoms, mixtures of ethylene, 1-olefins of more than two carbon atoms and diolefins, and mixtures of propylene, 1-olefins of more than three carbon atoms and diolefins. Particularly useful 1-olefins other than ethylene and propylene are 1-butene, 1-pentene and 1-octene, while particularly useful diolefins are 1,4-hexadiene and dicyclopentadiene. The mol percent of the ethylene polymerized as a mixture with propylene is usually 30 to 70 percent with the mol percent of propylene being 70 to 30 although compositions going to 100 percent of either component are useful. When the ethylene or propylene is in combination with other 1-olefins, the mol percent of the other 1-olefin is usually from 0.1 to 30 percent with 1 to 10 percent being preferred. The mixtures which also contain diolefin usually contain up to 10 mol percent diolefin with 1 to 5 mol percent being preferred.

The polymers produced by the above process have uses which are well known, i.e., packaging films, tubing, etc.

The following examples are presented to illustrate but not to limit the invention.

EXAMPLE 1

Into a 500-milliliter, three-necked flask blanketed with nitrogen were placed 200 milliliters of n-hexadecane, 3 milliliters (0.01 mol) tetraisopropyl titanate, and 20 milliliters t-butyl alcohol. The amount of triisobutyl aluminum listed in Table I was then added. The mixture was then heated to remove excess isopropyl and t-butyl alcohol. Further heating to approximately 250°C. caused the decomposition of the aluminum and titanium t-butoxides into aluminum and titanium oxides (the precipitation temperature for each run is shown in Table I). Heating at 250°C. under a slow stream of nitrogen was continued for 30 minutes to ensure that all traces of alcohol formed during the alkoxide decomposition were removed. Then the metal oxide slurry was cooled to 50°C. and ethylene at atmospheric pressure was passed through the reaction flask. Polymerization was initiated by adding 2.0 milliliters of 1.0 M triisobutyl aluminum. Polymerization was allowed to proceed for 30 minutes at 50°C. and was then terminated by adding 50 milliliters of n-butyl alcohol. The product was thoroughly washed with a 50/50 cyclohexane/acetone mixture and dried in a vacuum oven at 70°C. Rates of polymerization were calculated as grams of polymer/gram catalyst/hour and are shown in Table I for each run.

TABLE I

| Run | Mol of Triisobutyl Aluminum Added | Precipitation Temp. of Catalyst | Grams of Polymerization Product | Rate of Polymerization (g. of polymer/ g. of catalyst/ hour) |
|---|---|---|---|---|
| 1 | none | 261° C. | 4.4 | 9.0 |
| 2 | 0.001 | 263° C. | 6.1 | 12.3 |
| 3 | 0.002 | 261° C. | 7.7 | 15.1 |
| 4 | 0.005 | 253° C. | 11.0 | 18.9 |
| 5 | 0.01 | 253° C. | 10.4 | 14.0 |
| 6 | 0.02 | 228° C. | 10.0 | 9.1 |

EXAMPLE 2

Into a 500-milliliter, three-necked flask blanketed with nitrogen were placed 200 milliliters of n-hexadecane and 2.6 milliliters (6.0 millimols) tetra-t-amyl titanate; the amount of aluminum t-butoxide indicated in Table II was also added for each run. The mixtures were heated until precipitation occurred (normally about 250° C.) and heating under nitrogen flow was continued at 250° C. for 15 minutes after precipitation to remove alcoholic decomposition products. Then the metal oxide slurries were cooled to 150° C. and ethylene at atmospheric pressure was passed through the reaction flask. Polymerization was initiated by adding 1.0 milliliter of 1.0 M triisobutyl aluminum. Polymerization was allowed to proceed for 15 minutes at 150°C. and was then terminated by adding 50 milliliters of n-butyl alcohol. The product was washed with 50/50 cyclohexane/acetone mixture and dried in a vacuum oven at 70°C. The amount of polymerization product and polymerization rates are given for each run in Table II.

TABLE II

Rate of

| Run | Mol of Aluminum t-butoxide Added | Grams of Polymerization Product | Polymerization (g. of polymer/ g. of catalyst/ hour) |
|---|---|---|---|
| 1 | none | 1.3 | 7 |
| 2 | 0.0015 | 3.0 | 17 |
| 3 | 0.0030 | 4.1 | 22 |
| 4 | 0.0045 | 4.7 | 23 |
| 5 | 0.0054 | 4.4 | 20 |

EXAMPLE 3

Into a 500-milliliter, three-necked flask blanketed with nitrogen were placed 200 milliliters dry n-hexadecane, 1.8 milliliters (0.006 mol) tetraisopropyl titanate, 20 milliliters t-amyl alcohol and 0.003 mol of triisobutyl aluminum. The mixture was heated to distill off isopropyl alcohol and excess t-amyl alcohol and heating was continued to 250° C. under nitrogen flow for 30 minutes to remove t-amyl alcohol formed during alkoxide decomposition. The catalyst slurry was then cooled to 50° C. and ethylene at atmospheric pressure was introduced. Polymerization was initiated by adding the amount of triisobutyl aluminum listed in Table III for each run. Polymerization was allowed to proceed for 30 minutes at 50° C. and was then terminated by adding 50 milliliters of n-butyl alcohol. The product was thoroughly washed with 50/50 cyclohexane/acetone and dried in a vacuum oven at 70° C. Table III indicates the grams of product for each run and the rate of polymerization for each run.

TABLE III

| Run | Mol of triisobutyl aluminum Used to Initiate Polymerization | Grams of Polymerization Product | Rate of Polymerization (g. of polymer/ g. of catalyst/ hour) |
|---|---|---|---|
| 1 | 0.0005 | 10.1 | 30.1 |
| 2 | 0.001 | 11.6 | 34.8 |
| 3 | 0.002 | 6.7 | 19.3 |
| 4 | 0.005 | 6.3 | 18.0 |
| 5 | 0.010 | 7.6 | 22.2 |

EXAMPLE 4

Two hundred milliliters of dry n-hexadecane were placed in a 500-milliliter, three-necked flask under a nitrogen atmosphere. Then 1.8 milliliters (0.006 mol) tetraisopropyl titanate and 20 milliliters of tertiary alcohol listed in Table IV were added. Finally, 0.003 mol of triisobutyl aluminum was added and allowed to react with the alcohol to form the appropriate aluminum alkoxide. The reaction was heated to first distill off isopropyl alcohol and convert the titanium isopropoxide to the titanium alkoxide of the added alcohol and to finally remove excess alcohol and thoroughly decompose the tertiary alkoxides into titanium and aluminum oxides. Heating was continued at 250° C. for 30 minutes under a stream of nitrogen to remove alcoholate decomposition products. The oxide slurry was cooled to 50° C. and saturated with ethylene at atmospheric pressure. Polymerization was initiated by adding 0.001 mol of triisobutyl aluminum. After polymerizing for 30 minutes at 50° C., the polymerization was terminated by adding 50 milliliters of n-butyl alcohol. The polymerization product was thoroughly washed with a 50/50 solution of cyclohexane/acetone and dried in a vacuum oven at 70° C. Table IV, besides depicting the alcohol used, presents the temperature at which precipitation of the oxides occurred, grams of product formed and rate of polymerization.

TABLE IV

| Run | Alcohol Used to Make the Alkoxides | Temperature of Precipitation | Grams of Polymerization Product | Rate of Polymerization (g. of polymer/ g. of catalyst/ hour) |
|---|---|---|---|---|
| 1 | 2-methyl-2-butanol | 230° C. | 4.0 | 12 |
| 2 | 2-methyl-2-pentanol | 230° C. | 6.3 | 18 |
| 3 | 2-methyl-2-hexanol | 210° C. | 12.9 | 39 |
| 4 | 2-methyl-2-heptanol | 228° C. | 13.3 | 40 |
| 5 | 4-methyl-4-heptanol | 210° C. | 12.6 | 38 |

EXAMPLE 5

Run 1 of Example 1 was repeated except that no t-butyl alcohol was added to convert the tetraisopropyl titanate to titanium t-butoxide. Thermal decomposition was more difficult than with tertiary alkoxides and decomposition to a gray-green solid occurred only after heating at 279° C. for 5 minutes. When activated with 0.002 mol of triisobutyl aluminum, polymerization of ethylene at atmospheric pressure and 50° C. was slow. Total product recovered was 1.5 grams which corresponds to a polymerization rate of 1.7 grams of product/grams of catalyst/hour.

EXAMPLE 6

In a 500-milliliter flask were mixed 200 milliliters of dry n-hexadecane, 0.010 mol of the metal alcoholates listed in Table V, 20 milliliters of t-butyl alcohol and 0.010 mol of triisobutyl aluminum. The mixture was heated to distill off excess alcohols and to form the metal t-butoxide. Further heating was carried out to decompose the t-butoxides into oxides. Heating was continued at 275°–280° C. for 30 minutes under a flow of nitrogen to remove alcoholic decomposition products. The mixture was then cooled to 50° C. and ethylene at atmospheric pressure passed through. The catalyst was activated by adding 0.002 mol to triisobutyl aluminum and polymerization was allowed to proceed for 30 minutes. Then the reaction was terminated by adding 10 milliliters of n-butyl alcohol. The product was thoroughly washed with a 50/50 solution of cyclohexane/acetone and dried. Table V depicts the precipitation temperatures for the oxides, the yield of polymerization product in grams, and the rate of polymerization.

TABLE V

| Run | Mol and kinds of metal alcoholates | Precipitation Temperature of Oxides | grams of Polymerization Product | Rate of Polymerization (g. of polymer/ g. of catalyst/ hour) |
|---|---|---|---|---|
| 1 | 0.010 mol tetraisopropyl zirconate | 270° C. | 2.5 | 0.9 |
| 2 | 0.010 mol tri-n-butyl vanadate | 155° C. | 3.0 | 2.3 |
| 3 | 0.005 mol tri-n-butyl vanadate + 0.005 mol tetraisopropyl titanate | 186° C. | 8.2 | 9.7 |
| 4 | 0.005 mol tetraisopropyl zirconate + 0.005 mol tetraisopropyl titanate | 263° C. | 7.0 | 7.3 |

EXAMPLE 7

Into a 500-milliliter, three-necked flask in a dry nitrogen atmosphere were added 200 milliliters of dry n-hexadecane, 2.6 milliliters (0.006 mol) tetra-t-amyl titanate and the amount of triethyl aluminum listed in Table VI. The mixture was heated to precipitate the titanium in aluminum oxides. The resulting catalyst was white in Runs 1 through 4 and dark in Runs 5 and 6. Heating was continued at 250° C. under a stream of nitrogen for 15 minutes to remove any residual t-amyl alcohol formed during thermal decomposition. The catalyst slurry was then cooled to 50° C. and saturated with ethylene in atmospheric pressure. With excess ethylene passing through the flask, polymerization was initiated by adding 0.001 mol triisobutyl aluminum. Polymerization was allowed to proceed for 15 minutes at 50° C. and was then terminated by adding n-butyl alcohol. The products were thoroughly washed with a 50/50 solution of cyclohexane/acetone and dried in a vacuum oven. Table VI depicts the amounts of triethyl aluminum added, the precipitation temperatures for the oxides, the polymerization product yield in grams and the polymerization rate.

TABLE VI

| Run | Mol of Triethyl aluminum | Precipitation temp. | Grams of Polymerization Product | Rate of Polymerization (g. of polymer/ g. of catalyst/ hour) |
|---|---|---|---|---|
| 1 | none  | 260° C. | 3.2 | 23 |
| 2 | 0.001 | 268° C. | 4.8 | 32 |
| 3 | 0.002 | 252° C. | 5.2 | 32 |
| 4 | 0.004 | 253° C. | 8.3 | 45 |
| 5 | 0.006 | 254° C. | 6.8 | 30 |
| 6 | 0.008 | 250° C. | 6.6 | 26 |

EXAMPLE 8

Into a 500-milliliter, three-necked flask under a nitrogen flow of 900 cc. per minute were placed 200 milliliters of dry n-hexadecane and 2.3 milliliters (0.006 mol) tetra-t-butyl titanate. As indicated in Table VII, either 0.003 or 0.006 mol of triethyl aluminum were added at a temperature of 120° C. The extent of titanate reduction was followed by measuring the ethane produced using the infrared band at 3.4 microns. The amount of ethane being evolved was continuously plotted on a recorder attached to the infrared instrument. It was assumed that 1 mol of ethylene was being produced for each mol of ethane observed. When the desired reduction of titanate had been achieved as indicated by the ethane produced, the reduction was terminated by adding the stoichiometric amount of t-butyl alcohol to react with the residual triethyl aluminum. Then the solution was heated to 247°–267° C. to induce the precipitation of the metal oxides. Heating at 250° C. was continued for 15 minutes under nitrogen flow to remove alcohol as decomposition products. The catalyst slurry was cooled to 50° C. and the nitrogen flow replaced by ethylene. Polymerization was initiated by adding 0.001 mol of triisobutyl aluminum and was terminated after 15 minutes at 50° C. by adding n-butyl alcohol. The polymer was thoroughly washed with a 50/50 solution of cyclohexane/acetone and dried in a vacuum oven at 30° C. Table VII presents the amount of triethyl aluminum added to the reaction, the valence of the titanium after reduction, the amount of t-butyl alcohol added to stop the reduction of the titanium, the precipitation temperature of the metal oxides, yield of the polymerization, and the polymerization rate.

TABLE VII

| run | mol of triethyl aluminum added | valence of titanium after reduction | Mol of t-butyl Alcohol added to terminate reduction | precipitation temperature | grams of polymerization Product | polymerization rate (g. of polymer/g. of catalyst/ hour) |
|---|---|---|---|---|---|---|
| 1 | 0.006 | 1.96 | 0.006 | 252° C. | 7.2  | 32 |
| 2 | 0.006 | 3.04 | 0.012 | 247° C. | 10.0 | 47 |
| 3 | 0.003 | 3.12 | 0.003 | 256° C. | 8.1  | 48 |
| 4 | 0.003 | 3.51 | 0.006 | 267° C. | 10.1 | 60 |

EXAMPLE 9

Into a 500-milliliter, three-necked flask blanketed with nitrogen, were placed 200 milliliters n-hexadecane, 2.3 milliliters (0.006 mol) tetra-t-butyl titanate, and 0.003 mol aluminum t-butoxide. With vigorous stirring, 3.0 milliliters of 1.0 M water in t-butyl alcohol were added. The mixture was heated and rapidly precipitated the mixed oxides at 238° C. The heating was then continued at 250° C. for 15 minutes. The mixture was cooled to 50° C. and saturated with ethylene. Polymerization was started by adding 0.001 mol of triisobutyl aluminum. After polymerizing for 15 minutes, the reaction was terminated by adding 50 milliliters of n-butyl alcohol. The product was washed thoroughly in a 50 percent cyclohexane/50 percent acetone mixture and was dried at 70° C. in a vacuum oven. The dried polymer weighted 9.2 grams which corresponds to the polymerization rate of 54 grams of polymer/grams of catalyst/hour.

EXAMPLE 10

A comparative Example between catalyst with the heating step and catalyst without the heating step.
Catalyst without the heating step Into a 500-milliliter, three-necked flask blanketed with nitrogen were placed 200 milliliters of dry decahydronaphthalene. The solvent was heated to 50° C. and the nitrogen was replaced with ethylene. The following catalyst components were then added: 10 millimols of tetraisopropyl titanate and 20 millimols of triethyl aluminum. The polymerization was attempted for 30 minutes at 50° C. and then terminated with 100 milliliters of n-butyl alcohol. No polymer was obtained.
Catalyst with the heating step In a 500-milliliter, three-necked flask blanketed with nitrogen were placed 200 milliliters of dry n-hexadecane. To this were added 10 millimols of tetraisopropyl titanate, 20 milliliters of t-butyl alcohol and 20 millimols of triisobutyl aluminum. The mixture was heated to 250° C. for 30 minutes to precipitate titanium and aluminum oxide and to drive off excess alcohol. Precipitation of the oxides occurred at 228° C. The mixture was cooled to 50° C. and saturated with ethylene. Polymerization was initiated by adding an additional 2 millimols of triisobutyl aluminum. Polymerization was allowed to proceed for 30 minutes at 50° C. and was then terminated with 50 milliliters of n-butyl alcohol. The resulting polymer was collected, washed and dried. Ten grams of polymer were obtained.

Into a 500-milliliter, three-necked flask blanketed with nitrogen were placed 200 milliliters of n-hexadecane, 10 millimols of tetra-t-butyl titanate and 7 millimols of triethyl aluminum. The mixture was heated at 250°C. for 30 minutes to precipitate the titanium and aluminum oxide to drive off decomposition products produced during the formation of the mixed oxides. Precipitation of the oxides occurred at 248°C. The mixture was then cooled to 50°C. and saturated with ethylene. Polymerization was initiated by adding 2 millimols of triisobutyl aluminum. With excess ethylene continually passing through the flask, polymerization was allowed to proceed for 30 minutes at 50°C. It was then terminated with 50 milliliters of n-butyl alcohol. After washing and drying in a vacuum oven, the product weighed 19.6 grams.

EXAMPLE 11

A reaction product of titanium and aluminum t-pentoxide was prepared by mixing at 50°C., 6.85 grams (0.034 mol) of aluminum isopropoxide, 20 ml. (0.067 mol) of tetraisopropyl titanate, and 20 ml. of t-amyl alcohol with 0.60 ml. (0.033 mol) of water dissolved in 20 ml. of t-amyl alcohol. The mixture was heated to 105°C under nitrogen flow to remove isopropyl alcohol and excess t-amyl alcohol. The product had a density of 0.945 g./cc.

Three ml. of the above product (which contained 0.006 g. atoms of titanium and 0.003 g. atoms of aluminum) was added to 200 ml. of dry n-hexadecane in a 500 ml., three-necked flask blanketed with a nitrogen flow. The mixture was heated to precipitate the oxides and heating was continued at 250°C for 15 minutes under nitrogen flow to remove alcoholic by-products of the oxides formation. The mixture was cooled to 50°C. and the nitrogen flow was replaced with an ethylene flow at atmospheric pressure. Polymerization of ethylene was initiated by adding 0.001 mol of n-butyl lithium. The polymerization was allowed to proceed for 15 minutes at 50°C with excess ethylene passing through the reaction mixture. The product was washed several times with a 50/50 mixture of cyclohexane and acetone. After drying, the solid product weighted 1.3 grams.

EXAMPLE 12

Two-hundred ml. of dry n-hexadecane were placed in a 500 ml., three-necked flask blanketed with nitrogen and 0.006 mol of tetra-t-amyl titanate and 0.004 mol of triethyl aluminum were added. The mixture was heated to precipitate the oxides. Heating was continued for 15 minutes at 250°C under nitrogen flow to remove any alcoholic products formed during oxide formation. The mixture was cooled to 50°C and the nitrogen flow replaced with ethylene. Polymerization was initiated by adding 0.001 mol of diethyl zinc. Polymerization was allowed to proceed for 15 minutes at 50°C under excess ethylene flow at atmospheric pressure. A small amount of polymer of very high molecular weight was obtained.

EXAMPLE 13

In a 500 ml., three-necked flask blanketed with a nitrogen flow were placed 200 ml. dry n-hexadecane, 0.006 mol tetra-t-amyl titanate and 0.004 mol of diethyl aluminum hydride. The mixture was heated and solids precipitated at 243°C. Alcoholic by-products of the oxide formation were removed by continuing to heat at 250°C for 15 minutes under nitrogen flow. The mixture was cooled to 50°C and the nitrogen flow was replaced by an ethylene flow. Polymerization was then initiated by adding 5.5 ml. of a solution prepared by mixing 0.0005 mol of diphenyl magnesium and 0.0005 mol of triisobutyl aluminum. The polymerization was allowed to proceed for 15 minutes at 50°C under excess ethylene flow at atmospheric pressure. After drying, the product weighed 5.4 grams.

I claim:

1. A polymerization catalyst comprising (a) a catalyst component comprising metal oxide formed by heating in a solvent selected from the class consisting of hydrocarbon solvent and chlorinated aromatic hydrocarbon solvent at from 150°C. to 400°C. a substance consisting essentially of (1) 100 to 5 mol percent (expressed as the mols of the metals of Group IVB, VB, and VIB relative to the mols of aluminum plus the mols of the metals of Groups IVB, VB, and VIB present in the substance) of at least one member selected from the class consisting of secondary alkoxides of the metals of Groups IVB, VB, and VIB and tertiary alkoxides of the metals of Groups IVB, VB, and VIB and (2) 0 to 95 mol percent (expressed as the mols of aluminum relative to the mols of Groups IVB, VB, and VIB plus the mols of aluminum present in the substance) of a member selected from the class consisting of aluminum trialkyl, secondary aluminum alkoxides, tertiary aluminum alkoxides, and mixtures thereof, and (b) at least one member of the class consisting of alkyls of the metals of Groups IA, IIA, IIB, and IIIA and aryls of the metals of Groups IA, IIA, IIB, and IIIA wherein the amount of (b) present is 0.01:1 to 10:1, expressed as the mol ratio of the metals of Groups IA, IIA, IIB, and IIIA to the Group IVB, VB, and VIB metals.

2. The catalyst of claim 1 in which the catalyst component is formed by heating the substance for 1 second to 1 hour.

3. The catalyst of claim 1 wherein the catalyst component is formed by heating the substance in the presence of tertiary alcohol.

4. The catalyst of claim 3 wherein the catalyst component is formed by heating the substance wherein aluminum is present in the presence of water such that the mol ratio of water to aluminum present is from 0.1:1 to 2:1.

5. The catalyst of claim 3 in which the tertiary alcohol is selected from the class consisting of t-butyl alcohol, t-amyl alcohol, 2-methyl-2-pentanol, 2-methyl-2-hexanol, 2-methyl-2-heptanol and 4-methyl-4-heptanol.

6. The catalyst of claim 1 in which the secondary alkoxides of the metals of Groups IVB, VB, and VIB of the catalyst component are selected from the class consisting of tetraisopropyl titanate and tetraisopropyl zirconate and the tertiary alkoxides of the metals of Groups IVB, VB, and VIB of the catalyst component are selected from the class consisting of tetra-t-butyl titanate, tetraet-butyl zirconate, tri-t-butyl vanadate, tetra-t-amyl titanate, tetra-t-amyl zirconate, and tri-t-amyl vanadate.

7. The catalyst of claim 6 in which the aluminum trialkyl of the catalyst component is selected from the class consisting of triisobutyl aluminum and triethyl aluminum, the secondary aluminum alkoxide is aluminum isopropoxide and the tertiary aluminum alkoxide of the catalyst component is selected from the class consisting of aluminum-t-butoxide and aluminum-t-pentoxide.

8. The catalyst of claim 7 in which the catalyst component is formed by heating the substance at 200° to 300°C. for 30 seconds to 15 minutes wherein the mol percent of (1) (expressed as the mols of the metals of Groups IVB, VB, and VIB relative to the mols of the metals of Groups IVB, VB, and VIB plus the mols of aluminum present in the substance) is 85 to 50 percent and the mol percent of (2) (expressed as the mols of aluminum relative to the mols of metals of Groups IVB, VB and VIB plus mols of aluminum present in the substance) is 15 to 30 percent.

9. The catalyst of claim 1 in which the hydrocarbon solvent is selected from the class consisting of hexane, cyclohexane, n-hexadecane, benzene, toluene and xylene.

10. The catalyst of claim 1 in which the tertiary alkoxides of the metals of Groups IVB, VB, and VIB of the catalyst component are formed by heating primary alkoxides of the metals of Groups IVB, VB, and VIB with a tertiary alcohol.

11. The catalyst of claim 8 wherein the alkyl of the metals of Groups IA, IIA, IIB, and IIIA is selected from the class consisting of triisobutyl aluminum, triethyl aluminum, diethyl magnesium, n-butyl lithium and diethyl zinc and the aryl of the metals of Groups IA, IIA, IIB, and IIIA is diphenyl magnesium.

12. The catalyst of claim 11 wherein (b) is an alkyl of the metals of Groups IA, IIA, IIB, and IIIA and is selected from the class consisting of triisobutyl aluminum and triethyl aluminum.

13. A process for the polymerization of ethylenically unsaturated olefin which comprises contacting said olefin at from 0° to 300°C. with a catalytic amount of the catalyst of claim 1.

14. The process of claim 13 wherein the pressure and time of polymerization are from 0 to 30,000 psig. and 0.1 to 1000 minutes, respectively.

15. The process of claim 13 wherein said olefin is selected from the class consisting of ethylene, propylene, mixtures of ethylene and 1-olefins of more than two carbon atoms, mixtures of propylene and 1-olefins of more than three carbon atoms, mixtures of ethylene, 1-olefins of more than two carbon atoms and diolefins, and mixtures of propylene, 1-olefins of more than 3 carbon atoms and diolefins.

16. A process for the polymerization of ethylenically unsaturated olefin which comprises contacting said olefin at from 0° to 300°C. with a catalytic amount of the catalyst of claim 3.

17. A process for the polymerization of ethylenically unsaturated olefin which comprises contacting said olefin at from 0° to 300°C. with a catalytic amount of the catalyst of claim 6.

18. A process for the polymerization of ethylenically unsaturated olefin which comprises contacting said olefin at from 0°C. to 300°C. with a catalytic amount of the catalyst of claim 7.

19. A process for the polymerization of ethylenically unsaturated olefin which comprises contacting said olefin at from 0°C. to 300°C. with a catalytic amount of the catalyst of claim 8.

20. The process for the polymerization of ethylenically unsaturated olefin which comprises contacting said olefin at from 0°C. to 300°C. with a catalytic amount of the catalyst of claim 11.

21. The process for the polymerization of ethylenically unsaturated olefin which comprises contacting said olefin at from 0°C. to 300°C. with a catalytic amount of the catalyst of claim 12.

* * * * *

PO-1050
(5/69)

UNITED STATES PATENT OFFICE
CERTIFICATE OF CORRECTION

Patent No. 3,687,910  Dated August 29, 1972

Inventor(s) RICHARD HAMILTON JONES

It is certified that error appears in the above-identified patent and that said Letters Patent are hereby corrected as shown below:

Col. 11, Claim 8, last line, should read -- is 15 to 50 percent. --

Signed and sealed this 20th day of February 1973.

(SEAL)
Attest:

EDWARD M. FLETCHER, JR.  ROBERT GOTTSCHALK
Attesting Officer  Commissioner of Patents